United States Patent [19]
Shuler et al.

[11] Patent Number: 5,768,781
[45] Date of Patent: Jun. 23, 1998

[54] METHOD OF MAKING A METAL HEAT INSULATOR

[75] Inventors: Stanley C. Shuler, Winston-Salem; John J. Hiers, Elkin; Timothy L. Byrd, Boonville, all of N.C.

[73] Assignee: Lydall, Inc., Manchester, Conn.

[21] Appl. No.: 658,204

[22] Filed: Jun. 4, 1996

Related U.S. Application Data

[63] Continuation of Ser. No. 573,879, Dec. 18, 1995, abandoned, which is a continuation of Ser. No. 418,430, Apr. 7, 1995, abandoned, which is a division of Ser. No. 179,122, Jan. 10, 1994, Pat. No. 5,424,139.

[51] Int. Cl.⁶ .......................... B21D 19/12; B21D 47/00; B21D 53/00
[52] U.S. Cl. .......................... 29/890.03; 29/6.1; 29/17.3; 29/17.4
[58] Field of Search .................... 428/596, 603, 428/608, 594, 604; 52/791.1; 29/6.1, 17.2, 17.3, 17.4, 890.03

[56] References Cited

U.S. PATENT DOCUMENTS

| | | | |
|---|---|---|---|
| 1,934,174 | 4/1933 | Dyckerhoff | 428/188 |
| 2,212,481 | 12/1940 | Sendzimir | 228/118 |
| 2,261,307 | 11/1941 | Still | 428/593 |
| 2,312,987 | 11/1943 | Grassick | 52/792 |
| 2,338,520 | 1/1944 | Labaree et al. | 52/809 |
| 2,720,948 | 10/1955 | Pajak | 52/806 |
| 2,814,717 | 11/1957 | Hardesty | 52/806 |
| 2,815,795 | 12/1957 | Vander Poel | 52/806 |
| 2,924,471 | 2/1960 | Poltorak et al. | 428/591 |
| 3,149,742 | 9/1964 | Hay et al. | 52/292 |
| 3,153,279 | 10/1964 | Chessin | 419/44 |
| 3,212,864 | 10/1965 | Rhudy | 428/59 |
| 3,672,022 | 6/1972 | York | 428/593 |
| 3,869,778 | 3/1975 | Yancey | 428/593 |
| 3,884,646 | 5/1975 | Kenney | 428/593 |
| 3,958,714 | 5/1976 | Barriere et al. | 220/442 |
| 4,037,751 | 7/1977 | Miller et al. | 428/593 |
| 4,170,675 | 10/1979 | Greengrass | 428/109 |
| 4,298,061 | 11/1981 | Hoeffken | 165/170 |
| 4,336,292 | 6/1982 | Blair | 428/593 |
| 4,489,852 | 12/1984 | Logan et al. | 220/469 |
| 4,595,120 | 6/1986 | Logan et al. | 220/469 |
| 4,678,115 | 7/1987 | Weisart | 228/183 |
| 4,703,159 | 10/1987 | Blair | 219/78.12 |
| 4,926,935 | 5/1990 | Haushalter | 165/185 |
| 5,011,743 | 4/1991 | Sheridan et al. | 428/600 |
| 5,111,577 | 5/1992 | Sheridan et al. | 29/890.03 |

FOREIGN PATENT DOCUMENTS

| | | | |
|---|---|---|---|
| 850292 | 12/1939 | France | 428/593 |
| 3-271443 | 12/1991 | Japan | 52/809 |

*Primary Examiner*—John Zimmerman
*Attorney, Agent, or Firm*—Griffin, Butler, Whisenhunt & Kurtossy

[57] ABSTRACT

A generally elongated, thin, metal sheet heat insulator (1) having at least two generally elongated, thin, metal sheets (3, 4, 5, 6 and 7) disposed generally one above the other in a spaced apart relationship and a metal separator (2) therebetween contacting both sheets for maintaining the spaced apart relationship. The improvement of the invention has distinct, non-woven, substantially open, metal separators (2) having a substantial Z-direction dimension (27) and have substantially parallel upper and lower contact surfaces (27, 29) spaced apart in the Z-direction (27) with a contact surface area of each contact surface less than about 30% of a planar area (48) of the separator parallel to the X and Y-dimensions of the separator.

28 Claims, 11 Drawing Sheets

METHOD OF MAKING A METAL HEAT INSULATOR

This is a continuation application of Ser. No. 08/573,879, filed Dec. 18, 1995, now abandoned, which application was a continuation of Ser. No. 08/418,430 filed Apr. 7, 1995, now abandoned, the latter application being in turn a divisional of Ser. No. 08/179,122 filed Jan. 10, 1994, now U.S. Pat. No. 5,424,139 issued Jun. 13, 1995.

The present invention relates to metal heat insulators, of a known type, having at least two generally elongated, planar, thin metal sheets disposed generally one above the other in a spaced-apart relationship with a metal separator therebetween contacting both of the sheets for maintaining that spaced-apart relationship. More particularly, the present invention relates to an improvement in the separator of such metal heat insulators.

BACKGROUND OF THE INVENTION

Heat insulators take many forms in the art, including insulators formed of woven and non-woven fibers of natural and, synthetic materials, e.g. plastics, glass fibers, mineral fibers and ceramic fibers. These fiber insulators are specially designed for specific purposes, bearing in mind the environment in which these insulators must operate. However, there is a particular application of heat insulators where such usual insulators are unacceptable, i.e. in very high temperature environments and where those environments may include high moisture conditions and/or corrosive conditions. In these environments, the usual fiber insulators are ineffective, since the melting temperature or softening temperature of those fibers is less than the temperature at which the insulator must operate. In addition, when the insulators operate in high moisture conditions, the usual fiber insulators absorb moisture and that absorbed moisture very substantially reduces the insulating value of such insulators. Further, those environments which include both high temperature and moisture, often also include corrosive conditions, and such corrosive conditions can easily degradate conventional fiber insulators.

For these very specialized environments, it has been known in the art that metal heat insulators are the best choice. These metal heat insulators, generally, have at least two generally elongated, planar, thin metal sheets disposed generally one above the other in a spaced-apart relationship, with a metal separator therebetween contacting both of the thin metal sheets for maintaining that spaced-apart relationship. Since these insulators are made entirely of metal, they can withstand the high temperatures and specialized environments. In addition, the thin metal sheets can be sealed at peripheral edges thereof, such as to make the insulator, essentially, watertight, and thus prevent the egress of moisture into the insulator. Also, in view of the very high temperatures of the environments, any moisture which does egress into the insulator is vaporized and, generally, expelled. Further, in corrosive conditions, the metal of the insulator, including both the thin metal sheets and the separator, can be made of an anti-corrosive metal or, alternatively, have an anti-corrosive coating or finish thereon, or parts thereof.

Probably the earliest successful example of such a metal heat insulator is disclosed in U.S. Pat. No. 3,212,864 to Rhudy, issued on Oct. 19, 1965. As disclosed in that patent, the metal heat insulators thereof are useful for insulating pipes or tubes carrying very hot liquids, such as liquid sodium. The insulator is made of a plurality of thin metal sheets having reflective surfaces of low thermal emissivity and a separator formed from a woven metal cloth, screen or mesh is disposed between adjacent thin metal sheets to maintain the spacing therebetween.

A more recent example of such insulators is shown in U.S. Pat. Nos. 5,011,743 and 5,111,577 to Sheridan, et al, which patents have a common assignee. These patents, very similarly to the Rhudy arrangement, use a plurality of spaced-apart thin metal sheets, disposed one above the other, but the thin metal sheets of those patents are spaced apart by a plurality of embossments extending from at least one of adjacent thin metal sheets, as opposed to the separate separator of the Rhudy patent. Thus, the embossments of the sheets maintain the spacing of the sheets, and no separate independent separator, such as that shown in the Rhudy patent, is required. The insulators of the Sheridan, et al patents are adapted for use in insulating high temperature sources from temperature sensitive elements relatively adjacent thereto, and such insulators have been used, for example, in insulating high temperature exhaust components of an automobile from other temperature sensitive parts of the automobile, e.g. the floorpan.

Very basically, in insulators of the nature described by the Rhudy patent and the Sheridan, et al patents, insulation is achieved by the spaced-apart thin metal sheets, such as thin aluminum sheets. Heat radiating from a heat source, e.g. an exhaust component, toward a first thin metal sheet of an insulator is, in part, absorbed by that first thin metal sheet. By conduction, that absorbed heat is spread across the length and width of that first sheet for dissipation by radiation, e.g. to a cooler part of an automobile under carriage, and by convection to air flowing over the insulator. Also, heat is radiated from that first sheet to a next underneath second sheet, but conduction between those two sheets is largely avoided, due to the spaced-apart configuration of those sheets, since the air gap between the two sheets significantly impedes heat transfer by conduction. This same insulating operation is continued to a next under sheet, etc., until a last underneath sheet again functions in the manner described above in connection with the first sheet.

Thus, when heat is absorbed by the first sheet, part of that heat is dissipated by radiation to cooler parts of the undercarriage of the automobile, and part of that heat is radiated to the next under sheet. That heat is again conductively transferred laterally in the second sheet, the same as the first sheet, and again radiates to cooler parts of the automobile. As this insulating function continues to the last underneath sheet, radiation and convection heat transfer to air flow over that last underneath sheet dissipates the heat and keeps that last underneath sheet relatively cool. In turn, an automobile component adjacent to the last underneath sheet is kept relatively cool, e.g. a floorpan of an automobile. The insulators, therefore, depend on maximum heat radiation from the insulator and minimum conductive heat transfer through the insulator.

As can, therefore, be appreciated, a critical element of such metal insulators is the means of spacing apart the thin metal sheets. At every point of contact between the separator and an adjacent thin metal sheet, unwanted conduction heat transfer through the insulator will occur. In addition, the separator will, at least in part, decrease movement of convection currents between adjacent thin metal sheets, and such decreased movement will decrease unwanted heat transfer by convection through the insulator. Also, the shape, size and configuration of the separator substantially affects the ability to form or configure the insulator into more complex shapes, such as to accommodate, for example, the underbody of an automobile, while not collapsing the insulator in the transverse direction, i.e. the Z-direction.

As noted above, the Rhudy patent suggests woven cloth, screen or mesh as the separator, and while each of these will provide substantial rigidity to the insulator in the Z-direction, i.e. transverse to the planar direction of the sheets, for conforming the insulator to more complex shapes as promised by Rhudy, each of these forms also makes substantial metal-to-metal contact with adjacent thin metal sheets, and, accordingly, the unwanted conductive heat transfer through the insulator is substantial. In addition, each of these forms of separators allows substantial heat transfer by convection.

On the other hand, the Sheridan, et al patents disclose embossments of at least one of adjacent thin metal sheets, which serve to maintain the spaced-apart relationship. These embossments limit the metal-to-metal contact between adjacent sheets and, therefore, limit conduction heat transfer through the insulator, as opposed to the greater metal-to-metal contact of the separators of the Rhudy patent. Therefore, there is a decrease in the amount of conduction heat transferred through the insulator. However, those embossments will allow substantial air currents between adjacent sheets and, therefore, heat transfer through the insulator by convection is significant.

While the Sheridan, et al patents provide some latitude for the configuration of those embossments, the embossments are, something in the configuration of an egg crate design, such that conduction heat transfer between adjacent sheets is limited to that conduction occurring between the metal-to-metal contact of the embossments and an adjacent sheet.

However, this arrangement leads to three serious difficulties. Firstly, the embossments of the Sheridan, et al patents are fairly large, relative to the thickness of the sheets, and, in toto, the embossments still provide substantial area of metal-to-metal contact between the embossments and an adjacent thin metal sheet, through which substantial conduction heat transfer takes place.

Secondly, those relatively large embossments allow significant movement of air currents between adjacent thin metal sheets, and, hence, convection heat transfer between adjacent thin metal sheets is quite significant.

Thirdly, since the embossments are formed from relatively thin metal sheets, e.g. aluminum foil, those relatively thin embossments provide very little compressive strength to the insulator in the Z-direction, i.e. the transverse direction to the planar direction of the sheets. When such an insulator is deployed as a heat shield under the body of an automobile, e.g. between a hot source of the exhaust system and the floorpan, the heat shield can be seriously dented in that transverse direction by ordinary road hazards, such as thrown stones, or can be damaged by misadventures of mechanics working in the area of the heat shield. Also, since the compressive strength, or rigidity, of the insulator in the transverse direction is relatively low, the insulator may buckle when being formed into necessary contours, e.g. for deployment as a heat shield under an automobile body, and especially when complex contours are required. Of course, each dented or buckled area constitutes an area for substantially increased unwanted conduction heat transfer. This causes serious reliability problems for the insulators of the Sheridan, et al patents, especially when used as a heat shield under an automobile, as briefly noted above.

It would, therefore, be of decided advantage to the art to provide such insulator, e.g. as heat shields, of the above nature, but which heat shields have decreased transverse conduction and convection heat transfer and, at the same time, provides substantial transverse direction compressive strength, or rigidity, such that the heat shields can withstand ordinary road hazards and can be conformed into complex contours without buckling or other deformation.

BRIEF SUMMARY OF THE INVENTION

The present invention is based on several primary discoveries and several subsidiary discoveries.

As a first discovery, it was found that, if the separator between adjacent thin metal sheets is separate and distinct, i.e. not permanently attached to or part of the sheets as in the Sheridan, et al patents, and made of certain non-woven, substantially open, metal materials, as opposed to the woven materials of the Rhudy patent, and has a substantial Z-direction dimension, that material will provide high transverse direction compressive strengths to the insulator, while at the same time very significantly reduces conductive heat transfer through the insulator.

As a second primary discovery, it was found that these certain non-woven, substantially open, metal materials have substantial degrees of freedom in the X and Y-directions, as opposed to the woven materials of the Rhudy patent. Thus, the non-woven material can easily bend, expand or contract in all planar directions and to a significant extent in the Z-direction. This allows formation of complex shapes and contours of a heat shield without buckling or other deformation.

As a subsidiary discovery in the foregoing regard, it was found that those certain non-woven materials have substantial Z-direction columnar strengths, i.e. compressive strengths, or rigidity, and the bending for producing complex shapes will not cause any substantial change in the Z-direction thickness of the insulator. Thus, the insulator will, essentially, stay intact in the Z-direction dimension, even with significant bending for contouring or configuring the insulator to a necessary shape for use as a heat shield fitted underneath an automobile body.

As another primary discovery, it was found that, when those certain non-woven materials have a substantial Z-direction dimension, only a small portion of the surfaces of the materials will actually contact an adjacent thin metal sheet. In view of this very small contact area, cumulative, the contact area of the materials with adjacent sheets is quite small, and, therefore, conduction heat transfer through the insulator is not substantially compromised, as opposed to the woven materials of the Rhudy patent.

As another primary discovery, it was found that, with the substantial Z-direction dimension of the non-woven material, as opposed to the more flat configuration of the woven materials of the Rhudy patent, significant transverse direction openings occur, and those openings substantially decrease movement of air currents between adjacent thin metal sheets, and, accordingly, heat transfer by convection is decreased, e.g. as opposed to the Sheridan, et al patents.

As a further subsidiary discovery, it was found that certain of the non-woven materials have substantial degrees of freedom in all directions, i.e. in the X, Y and Z-directions, and, therefore, substantial flexing of the insulator, e.g. as that which can be occasioned in use as a heat shield under automobile bodies, will not substantially deform the heat shield, as opposed to the heat shield of the Sheridan, et al patents.

The certain non-woven metal materials of the present invention, used as the separator, have in common a substantial Z-direction dimension and a decreased contact surface area on the upper and lower contact surfaces thereof, i.e. the surfaces which contact an adjacent thin metal sheet. More specifically, these certain non-woven metal materials have contact surfaces with contact surface areas less than about 30% of a planar area of the separator parallel to the X and Y-dimensions of the separator. Stated another way, in a separator having X and Y-dimensions of A and B, the surface area of a plane parallel to the X and Y dimensions equals A×B, and the present non-woven metal separators must have an upper surface (which contacts one adjacent thin metal sheet) and a lower surface (which contacts the next adjacent thin metal sheet) where total area of contact between the upper and lower surfaces is less than 30% of A×B.

Thus, very briefly stated, the present invention relates to an improvement in a generally elongated, thin, metal sheet heat insulator having at least two generally elongated, thin, metal sheets disposed generally one above the other in a spaced apart relationship and a metal separator therebetween contacting both of the sheets for maintaining the spaced apart relationship.

The present improvement comprises distinct, non-woven, open, metal separator having a substantial Z-direction dimension and having substantially parallel upper and lower contact surfaces spaced apart in the Z-direction with contact surface area of each contact surface less than about 30% of a planar area of the separator parallel to the X and Y-dimensions of the separator.

DETAILED DESCRIPTION OF PREFERRED EMBODIMENTS OF THE INVENTION

Figure 1B:
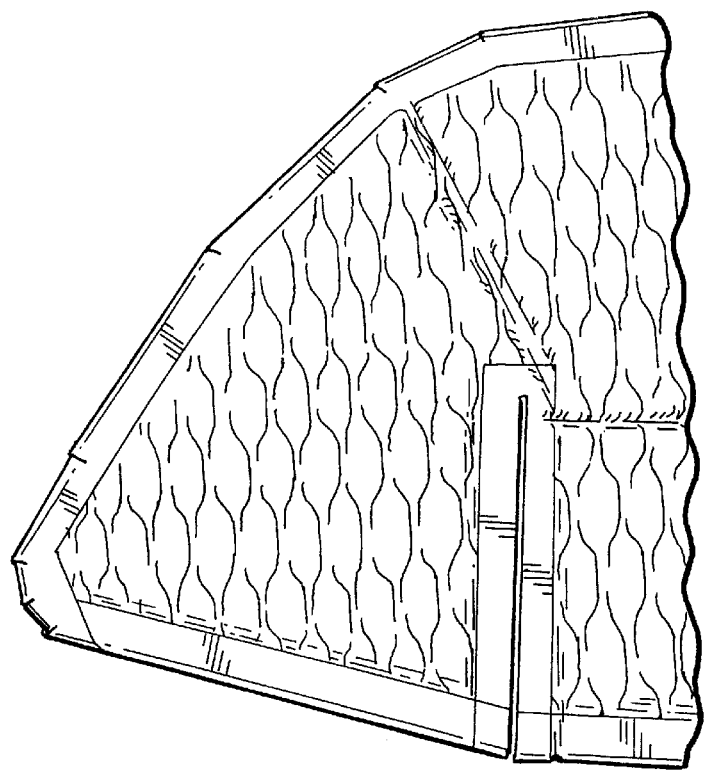
FIG. 1B is a top view thereof.
Figure 1A:
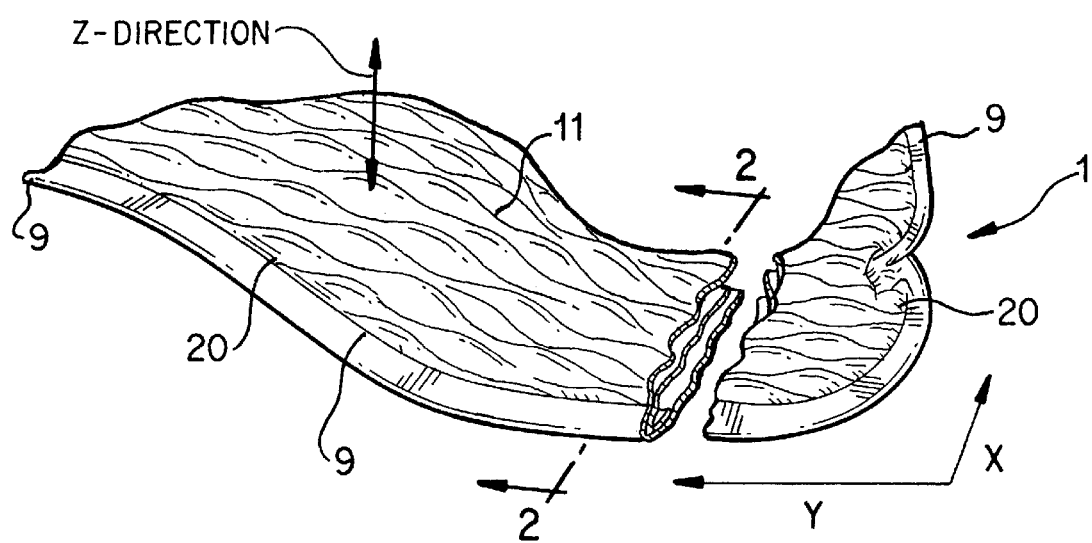
FIG. 1A is a partly elevated isometric view of a contoured insulator according to the present invention and suitable for use as an automobile heat shield.
Figure 2:
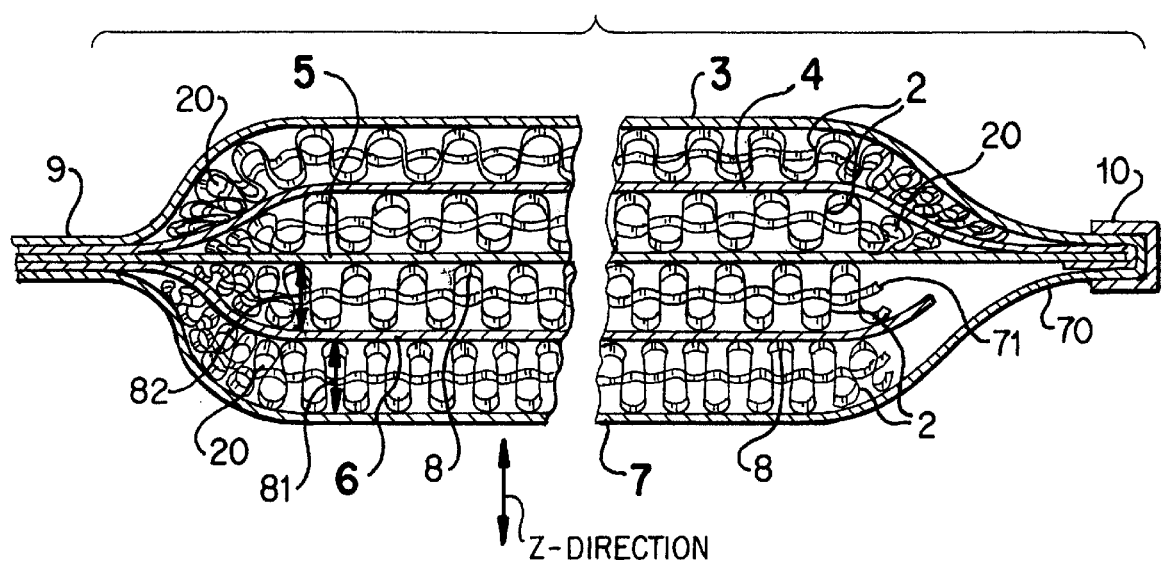
FIG. 2 is a cross-sectional view of FIG. 1 taken along lines I–II.

As can be seen in FIGS. 1A and 1B, the present heat insulator, e.g. in the form of an automobile heat shield, generally, 1 (see FIG. 1B) can be in a very complex configuration (see FIG. 1A) and still enjoy the advantages briefly described above. As shown in FIG. 2, separators 2 space apart thin metal sheets 3, 4, 5, 6 and 7. Any number of thin metal sheets may be used, e.g. 2 to 20 or more, and a separator is between adjacent thin metal sheets to hold those sheets in the required spaced-apart relationship. The peripheral edges 9 are usually sealed, e.g. may be clamped together by clamp 10. Thus, as so far described, FIGS. 1 and 2 illustrate the usual arrangement of prior art insulators.

FIGS. 1 through 5 show preferred embodiments of the present invention. However, for a more general understanding of the invention and differences between the invention and the prior art, FIGS. 9 through 13 are more instructive. Hence, those Figures will be first discussed in detail.

Figure 9:
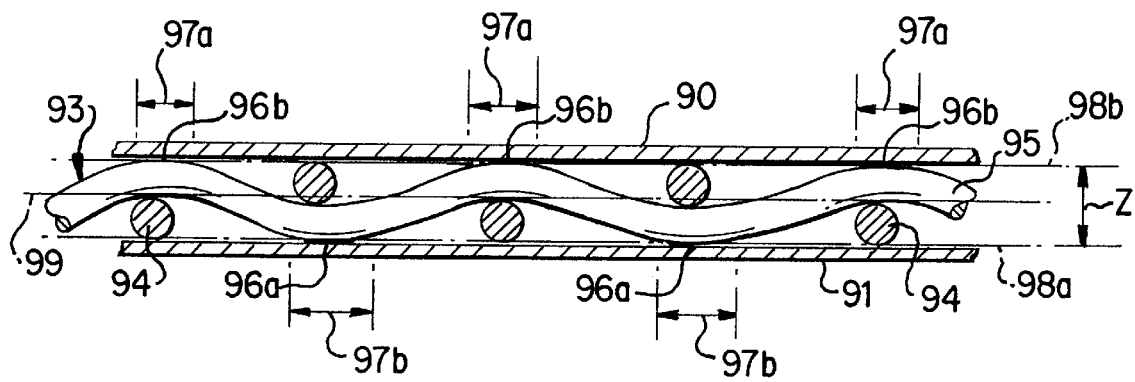
FIG. 9 is a diagrammatic illustration of a typical woven separator of the prior art.

FIG. 9 shows a cross-section of a Rhudy patent insulator having thin metal sheets 90 and 91 which are spaced apart in the Z-direction by a woven separator, generally, 93. The separator 93 consists of woven warp threads 94 and weft threads 95 (only one being shown). The inherent curvature of the weft threads 95, going under and over the warp threads 94, results in upper and lower contact portions 96a and 96b, having contact with thin metal sheets 90 and 91 along contact surfaces 97a and 97b. These contact surfaces, generally, lie in contact planes 98a and 98b, which contact planes are substantially parallel to each other and substantially parallel to a planar area 99 (the plane being into the paper of the drawings). Of course, a cross-section of the Rhudy insulator showing a cross-section through the weft threads 93, as opposed to the cross-section of FIG. 9 through the warp threads 94, would be identical to FIG. 9.

As can therefor be seen from FIG. 9, both the upper contact surface 97a and the lower contact surface 97b, for a typical woven separator, form a total contact surface area of about 50% of the planar area 99 of the separator parallel to the X and Y-dimensions thereof. In practical terms, this means that the contact surface areas of contact planes 98a and 98b are only about 50% less than that of a theoretical solid cross-section separator and, thus, about 50% of the conduction heat transfer through such a theoretical separator in the Z-direction will take place through the contact surface areas of contact planes 98a and 98b. This is simply too much contact surface area and very substantially reduces the efficiency and heat resistance of the insulator.

In addition, the Z-direction dimension of the woven separator is not substantial, as defined more specifically below, and this is inherent in a woven fabric because of the necessary lie of the warp and weft threads. Thus, the sheets must either lie close to one another or multiple layers of the woven separators must be used between sheets, which significantly increases cost and weight of the insulator.

Figure 10:
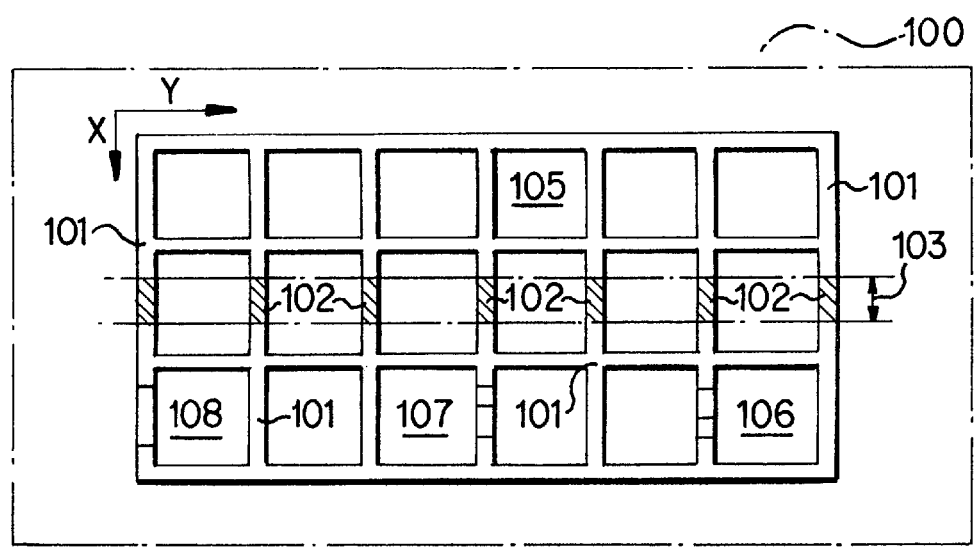
FIGS. 10, 11 and 12 are diagrammatic illustrations of differences between the prior art separator of FIG. 9 and the present separators.

FIG. 10 shows a top view of an idealized embodiment of the invention. In this figure, a thin metal sheet 100 (shown in phantom dashed lines) overlies and contacts upper contact surface 101. It can be seen that the contact surface area 102 of any segment 103 of the separator will be a small percentage of a planar area of the separator (the area encompassing all of the various segments 103), e.g. no more than 30% of the planar area, more usually less than 20% or 10% or even 5% and even lower than 1% of the planar area in connection with an embodiment. This is because the contact surface is open, i.e. not continuous in an X-Y direction uppermost plane. By so decreasing the contact surface area, unwanted conduction heat transfer through the Z-direction of the present insulator is correspondingly decreased.

Figure 11:
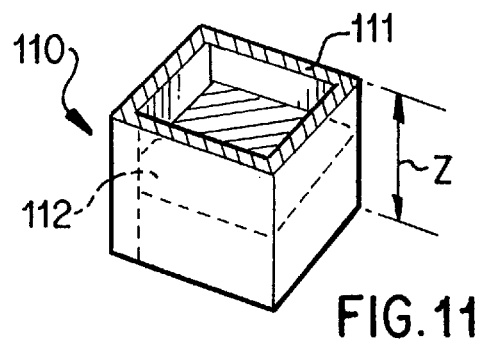

This can better be seen from FIG. 11 where one unit 105 of FIG. 10 is shown as an isolated unit 110. As can be seen from FIG. 11, the contact surface area 111 (shown hatched) is open and, thus, a small percentage of the planar area 112 (shown cross-hatched) of that isolated unit 110, e.g. about 10% or less of the planar area 112. This considerably decreases the contact surface area 111, i.e. by the percentage of the open area, and, consequently, the unwanted conduction heat transfer in the Z-direction.

Figure 12:
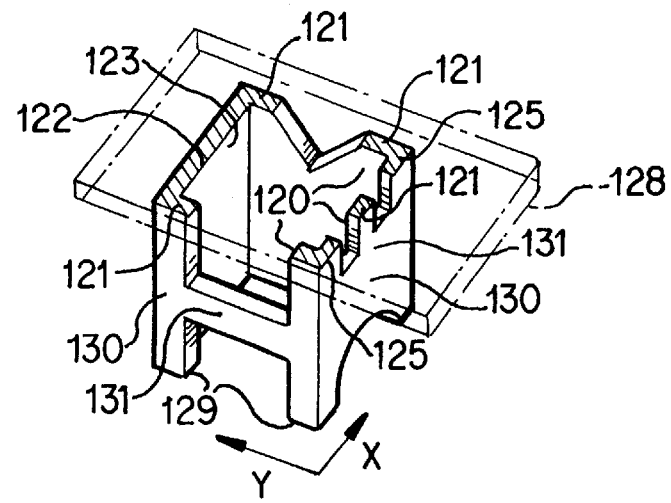

To even further reduce the contact surface area 111, the units 105 of FIG. 10 may have a variety of shapes which decrease the contact surface area, i.e. increase the open area, such as units 106, 107 and 108 of FIG. 10, which variety of shapes is exemplified in FIG. 12 where sides 120 have increased open area and, hence, decreased contact surface areas 121 (shown hatched), as opposed to the contact surface area 122 of side 123, which side has an open area and, hence, a contact surface area 122 identical to the contact surface area 111 of a side of a unit 110 in FIG. 11.

Such shapes of sides 120 provide a plurality of contact portions 125 which are generally spaced apart, with intervening open area, as shown in FIG. 12, and with such shapes and spacing apart, the cumulative contact surface area with a thin metal sheet 128 (shown in dashed phantom lines) can easily be 10% or less of the planar area 112, shown in FIG. 11. The open area need not extend entirely through the shape in the Z-direction, and may have a partition portion or a partial partition portion, for example, disposed along, for example, planar area 112. These shapes can take a wide variety of form, as exemplified in FIG. 12, including but not limited to the shown "V" shape, "toothed" shape, "H" shape, and circular or oval shape, as well as many others.

However, whatever shape is adopted, for purposes of structural integrity of the separator the contact portions 125 on both the upper and lower contact surfaces 121 and 129 should be connected by Z-direction connectors 130 which are capable of being substantially compressively loaded (e.g. columnar loading), so as to increase transverse rigidity and avoid crushing or damage or crimping of the insulators in the Z-direction, for the reasons briefly discussed above. This compressive loading is easily achieved by the shapes shown in FIG. 12.

It is also most preferred that at least some of the contact portions 125 be connected to at least one other contact portion 125 by X and/or Y-direction connectors 131, or the partition or partial partitions noted above, so as to, again, provide structural integrity of the separators, and more preferably where substantially all of the contact portions 125 are connected to adjacent contact portions by said X and Y-direction connectors, as shown in FIG. 10. Of course, to limit transverse conduction heat transfer through the X and/or Y-direction connectors, it is even more preferable that the X and/or Y-direction connectors do not substantially contact the thin metal sheet 128, as shown in FIG. 12, as opposed to substantial contact thereof, as shown in FIG. 10. This means that shapes, as exemplified in FIG. 12, are most preferred.

Figure 13:
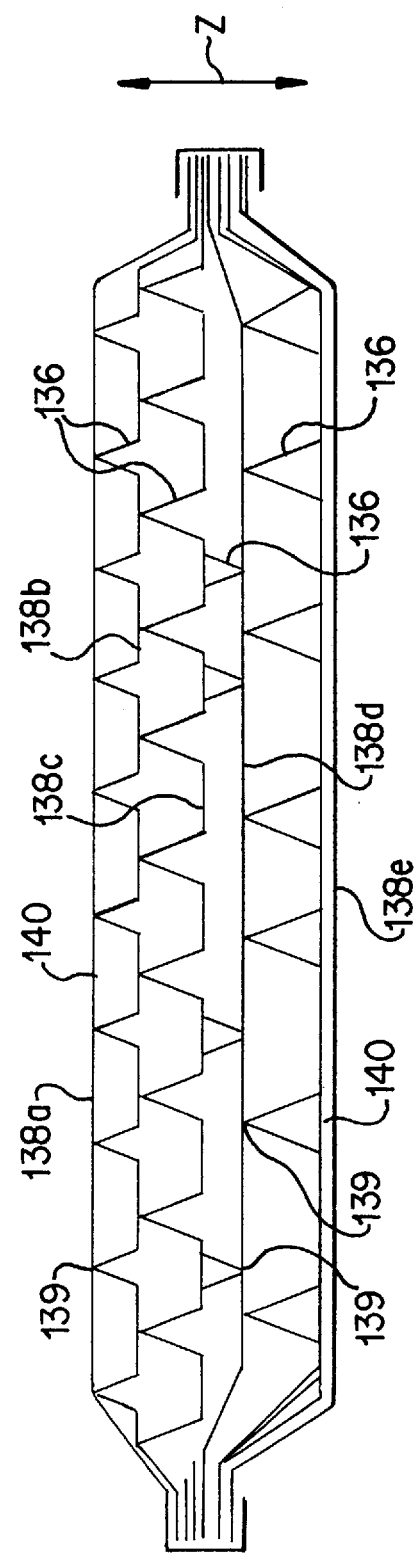
FIG. 13 is an illustration of other prior art and, in comparison with FIGS. 10, 11 and 12, illustrates differences between that prior art of FIG. 13 and the present invention.

The foregoing makes clear the present invention and how, in certain respects, it departs from the prior art shown in FIG. 9, i.e. the woven separators of the Rhudy patent. FIG. 13 shows a cross-section of an insulator of the Sheridan, et al patents, and as can be seen, the Sheridan, et al patents attempt to reduce the Z-direction conduction heat transfer by replacing the separate and distinct woven separator of Rhudy with a plurality of embossments 136 extending from layers 138a through 138e of the thin metal sheets, with the layers being offset with respect to each other such that at least some of the embossments are not aligned in the Z-direction. The embossments can also be in a non-uniform pattern or shape. While this arrangement limits conduction heat transfer in the Z-direction because of the limited contact portions 139 forming limited contact surface area on one end of the embossments, the other end of the embossments 140 have essentially no reduction in the contact portion, and, hence, contact surface area, which allows, essentially, unimpeded conduction heat transfer therethrough. The conduction heat transfer can be reduced by the corresponding number of embossments, but this, also correspondingly, reduces the Z-direction rigidity and resistance to damage, crimping, etc., as explained above. In addition, the shape of the embossments are not conducive to compressive, i.e. columnar, loading and the Z-direction rigidity is inherently much less than that of the Rhudy patent arrangement, which is a serious disadvantage, as explained above. All of the foregoing combine to result in a less than desirable insulator, all in terms of conduction heat transfer, ultimate "skin" temperature (the temperature of an outside thin metal sheet) and resistance to damage, as clearly shown by the data of the below example.

Thus, it can be seen that the present invention, as explained in connection with the generalized embodiments of FIGS. 10, 11 and 12, not only significantly reduce the Z-direction unwanted conduction heat transfer, as opposed to the Rhudy patent and Sheridan, et al patents arrangements, but also provide Z-direction rigidity similar to the arrangement of the Rhudy patent, and very much better than the Sheridan, et al patents, as the below example shows, which is a very substantial improvement in the art.

It will also be understood that, while the present generalized arrangements of FIGS. 10, 11 and 12 are quite improved arrangements, as noted above, those arrangements are also quite expensive to manufacture and, thus, would not be suitable for low cost insulators, such as required by automobile manufacturers. However, it has been found that the above-discussed properties of those generalized arrangements can be closely approximated with separators made of commercially available, low cost materials, and FIGS. 1 through 7 show those embodiments which are preferred because, only, of the low cost thereof.

Figure 4:
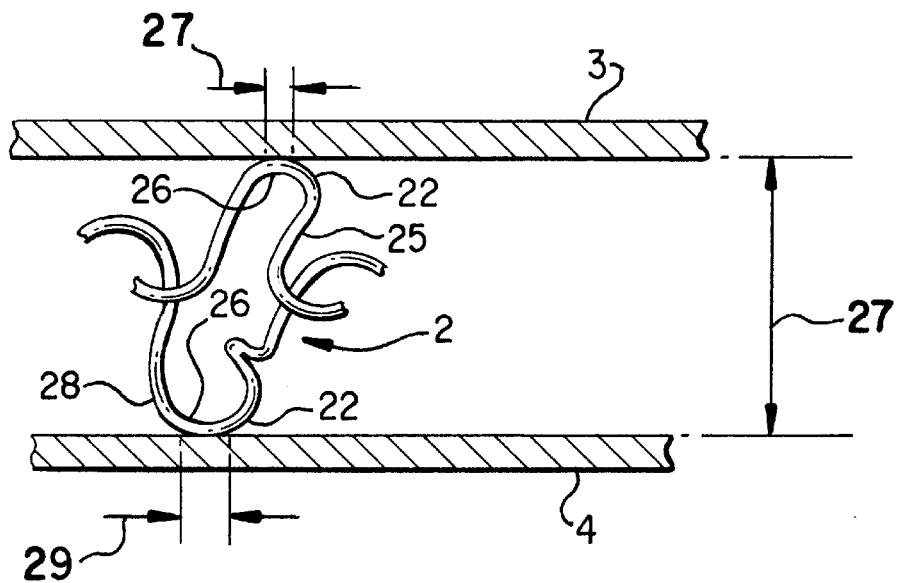
FIG. 4 is a highly idealized diagrammatic illustration of contact between the present knitted separator and adjacent thin metal sheets.
Figure 5A:
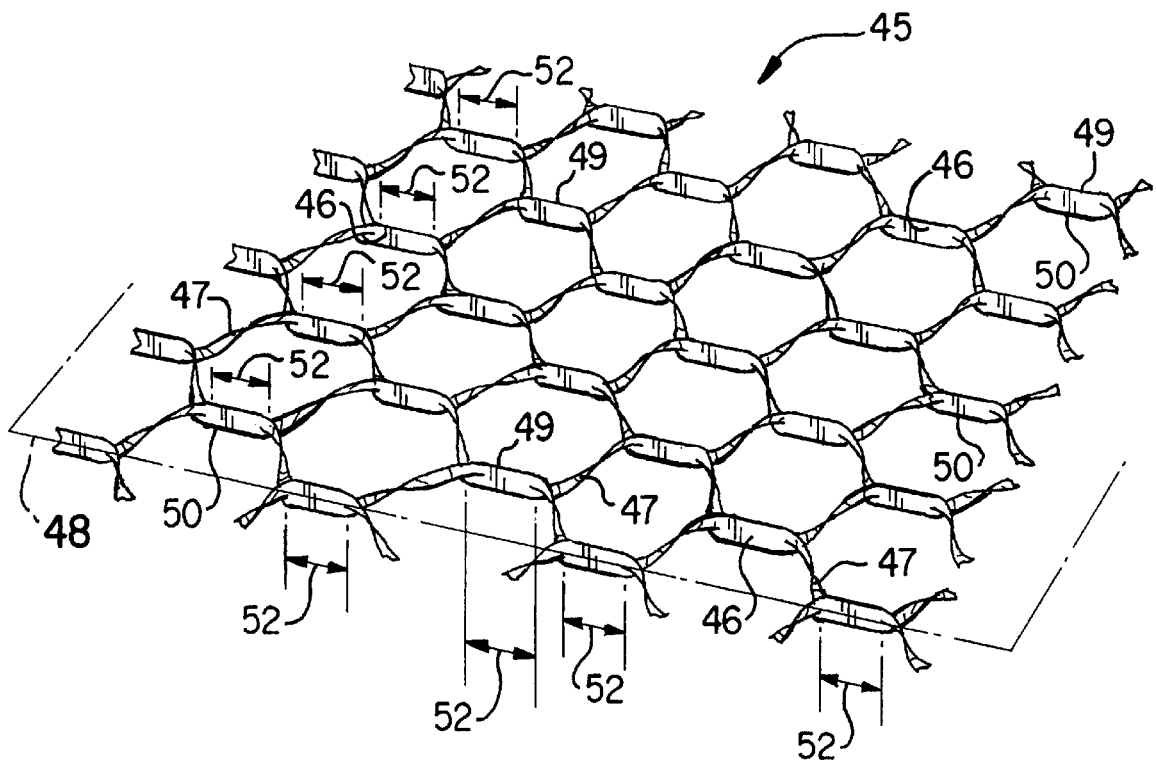
FIG. 5A is an isometric representative pattern of a typical twisted expanded foil separator useful with the present invention.
Figure 5B:
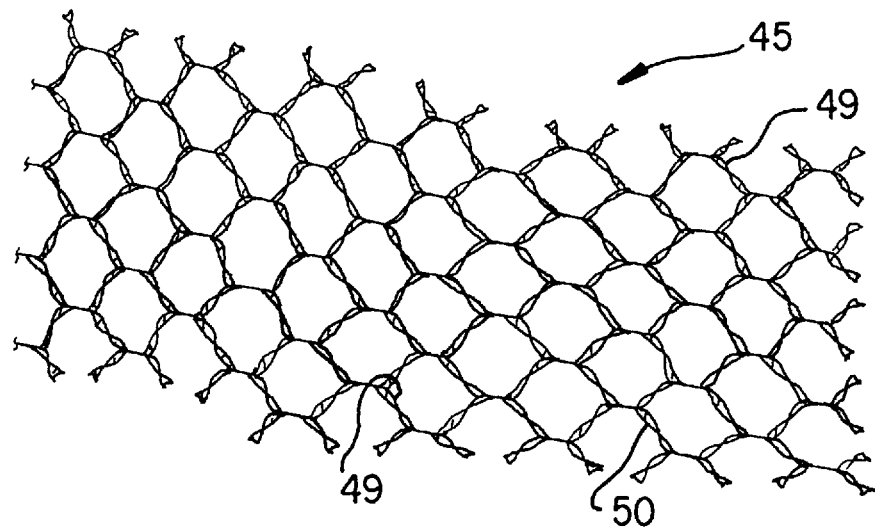
FIG. 5B is a plan view thereof.

Thus, turning back to FIGS. 1 through 7, in a preferred embodiment, the separators are made from a knitted, metal wire, fabric, i.e. a non-woven, open material, as shown in FIG. 3, which is commercially available and relatively inexpensive. The most preferred embodiment is where the separators are made from a twisted, open, expanded metal foil, as shown in FIGS. 5A and 5B, since such foils provide Z-direction integrity almost as good as the knitted fabric, but are much less expensive and provide lighter heat shields for automobiles, where cost and weight reduction are always important. Alternatively, the separators may be a combination of the knitted fabric and the twisted, expanded metal foil. For clarity purposes, the knitted fabric embodiment will be first discussed.

As can be seen from FIG. 2, the knitted fabric separator 2 is composed of interlocking loops 8 (also see FIG. 3), in the usual manner of constructing a knitted fabric. While FIG. 2 shows five thin metal sheets 3 through 7, and four separate and distinct knitted, metal wire, fabric separators 2, of course, the number of thin metal sheets and knitted fabric separators will depend upon the particular application of the insulator, and may be as little as only two thin metal sheets and one knitted fabric separator, or as many as fifteen to twenty-five thin metal sheets and fourteen to twenty-four knitted fabric separators. It is only necessary that there be at least two generally elongated thin metal sheets disposed generally one above the other in a spaced-apart relationship, as shown in FIG. 2, and the knitted, metal wire, fabric separator (or any other separator of the invention) is between those at least two sheets and contacts both of the sheets for maintaining the spaced-apart relationship.

The peripheral edges of the insulator may be open, but, most preferably, especially when the insulator is in the form of a heat shield for automobiles, in order to prevent egress of moisture or water, the peripheral edges are closed or sealed or at least partially closed or sealed. The peripheral edges may be closed in a number of different manners, and the particular manner of closing the peripheral edges is not critical, but, optionally, the peripheral edges may be closed by a crimp and/or weld 9 or a clamp 10, as shown in FIG. 2. Of course, in the area 20 where the crimping commences, compression of the knitted fabric separators will take place, with attendant increased conduction heat transfer, and, hence, that area 20 of compression should be as small as practical for the particular application.

The thickness of the thin metal sheets is not critical, but generally will range from about 0.0005 to about 0.030 inch, and more preferably from about 0.001 inch to 0.010 inch. However, since it is important to have a high surface area to thickness of the thin metal sheets in order to maximize radiation heat transfer from the sheets, per unit weight of the sheets, it is preferable that the surface area to thickness ratio of the thin metal sheets be at least 1000:1, and more preferable at least 2000:1, and even more preferably at least 3000:1.

The material of the thin metal sheets is not critical and may be, among others, steel, stainless steel, aluminum, copper, brass, bronze and tin. Alternatively, the thin metal sheets may be constructed with a base metal layer, e.g. a base metal of steel, aluminum, etc., and with a coating thereon, e.g. aluminum, copper, brass, bronze and tin. However, where corrosive atmospheres are encountered, the coating is preferably an anti-corrosion coating, such as zinc, copper, silver or chromium.

The distance that the sheets are spaced apart affects the heat transfer by both radiation and convection, and it is, accordingly, preferable that the sheets not be either too close together or too far apart. In addition, if the sheets are far apart, the insulator becomes bulky. It is, therefore, preferable that the sheets are spaced apart from about 0.050 inch to about one inch, and more preferably about 0.100 inch or 0.020 inch to about 0.500 inch. By providing an open separator with substantial Z-direction dimensions, as explained in more detail below, this can be easily achieved while yet limiting both conduction heat transfer and weight.

Also, in order to provide the radiation function from an adjacent sheet to another adjacent sheet or from a sheet to an adjacent heat absorption component, for example, a component of an automobile undercarriage, for heat absorption, as explained above, it is preferable that the sheets have a low thermal emissivity, especially an emissivity less than 0.1, and more preferably less than 0.05.

The knitted, metal wire, fabric separator can be made of any metal which can be formed into a wire for knitting purposes, but, preferably, the wire of the knitted, metal wire, fabric separator is steel, stainless steel, aluminum, copper, brass, bronze and tin. Similarly to the sheets, the metal wire may have a coating thereon, the same as described above in connection with the sheets, and, when corrosive environments are encountered, preferably the coating is an anti-corrosive coating, which anti-corrosive coating is the same as that described above in connection with the sheets.

However, in connection with the wire, in addition, the wire may simply have an oxidized film thereon, such as the oxidation film of aluminum wire. The oxidation film forms a heat resistant film on the wire, which decreases heat transfer by conduction. Such an oxidation film may also be used on the surfaces of the thin metal sheets, if desired.

The diameter of the wire can be from as little as 0.0005 inch to much higher, such as 0.030 inch, but more usually will be about 0.001 inch to 0.005 inch.

A wide variety of knit configurations may be used in the knitted, metal wire, fabric separator, and any of the conventional knit configurations are suitable for purposes of the present invention. However, for the reasons explained more fully below, it is preferable that the knitted fabric has at least three knit loops per linear inch, and more preferably at least five knit loops per linear inch, and even more preferably at least ten knit loops per linear inch. As can be seen from FIG. 3, the number of loops shown in that illustrative pattern is four loops per linear inch, as indicated by arrows 21.

As can be seen from FIG. 2, which shows a variety of different knit configurations in regard to knitted separator 2, the loops of the knitted, metal wire, fabric separator, at the outermost end 25 thereof (see FIG. 4) have arcs 26 with a radius no more than the distance 27 between the spaced-apart sheets, e.g. sheets 3 and 4. The arc shown in FIG. 4 is, of course, considerably less than that distance 27. In any event, in order to keep conduction heat transfer between adjacent sheets to useful limits, the radius of that arc should be no more than 0.25 inch, and far more preferably no more than 0.1 inch. The radius of those arcs can be quite small, however, e.g. 0.01 inch or less.

Figure 3:
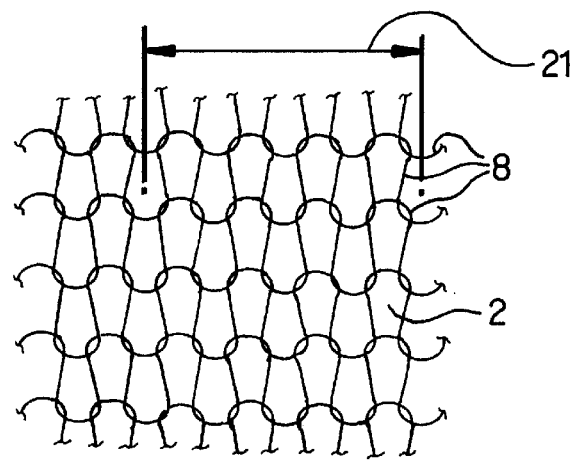
FIG. 3 is a representative pattern of a typical knitted separator useful with the present invention.

As noted above, any conventional knit configuration is useful, but a very convenient pattern of knit is the over-hand knit, as shown in FIG. 3, and this is a convenient form of the knit for purposes of the present invention. However, other knit configurations may be used, as desired.

Figure 6:
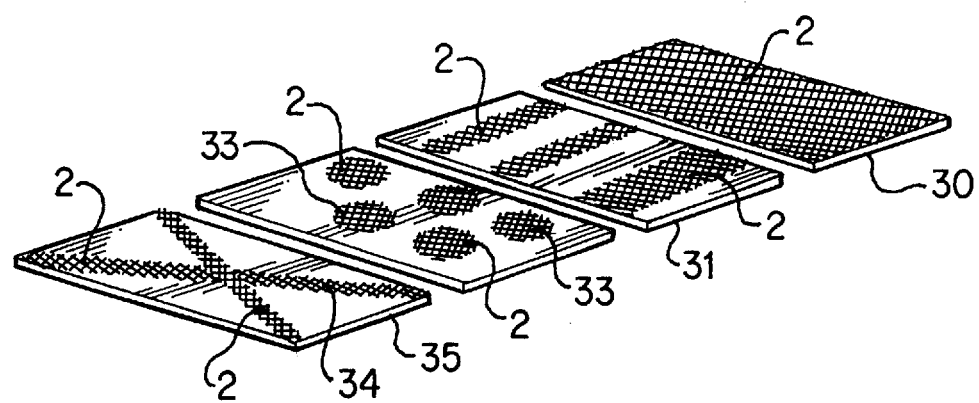
FIG. 6 is an illustration of various arrangements of the separator on one of the thin metal sheets.

The knitted fabric separator 2 may be substantially co-extensive with at least one of the sheets, e.g. sheet 30 of FIG. 6, but it may be less than co-extensive as shown on sheet 31 of FIG. 6, which shows the knitted, metal wire, fabric separator in strips. Alternative to strips, however, disc 33 of the knitted, metal wire, fabric separator may be used, e.g. discs of 0.5 to 4 inches or more. Further alternatively, the knitted, metal wire, fabric separator may be in strips of particular configurations, such as strips 34 on sheet 35 of FIG. 6.

Figure 7:
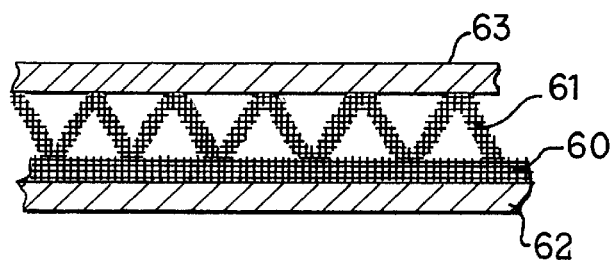
FIG. 7 is an idealized cross-section of two thin metal sheets with multiple layers of separators.

While there must be at least one layer of knitted, metal wire, fabric separator between adjacent thin metal sheets, there may be more than one layer, e.g. two or more layers, e.g. up to six or seven or eight layers of the knitted fabric, as shown by layers 60 and 61 between thin metal sheets 62 and 63 of FIG. 7. In addition, the knitted fabric separator need not be planar, such as shown by knitted fabric separator 60, in FIG. 7, but may have a non-planar configuration, such as the crimped configuration of knitted fabric separator 61, as shown in FIG. 7.

Referring to FIG. 2, peripheral edges of the sheets may be in contact with each other, as shown at the crimped edge 9 of FIG. 2. In addition, the peripheral edges of the sheets may be in contact with the knitted fabric, again as shown in FIG. 2 at crimped peripheral edge 9. However, this is not necessary, and, as shown at the right-hand portion of FIG. 2, at least some of the sheets, e.g. sheet 6, may terminate before reaching the peripheral edge 70 and some of the knitted fabric separators may also terminate prior to reaching the peripheral edge 70, as shown by the edge 71 of knitted fabric separator 2 in FIG. 2. While this could appear to provide a decreased X-Y stability of the insulator in view of the separators being separate and distinct from the sheets, e.g. not attached or formed therefrom, surprisingly, this is not the case. The contact portions, while each being small, are large in number, and the resulting friction between the separate and distinct separators and the sheets is great, giving good X-Y stability.

All of the sheets used in the insulator need not be spaced apart the same distance as other sheets, and at least two adjacent sheets may be spaced apart a different distance from two other adjacent sheets, as shown by the distances 81 and 82 of FIG. 2.

Figure 8:
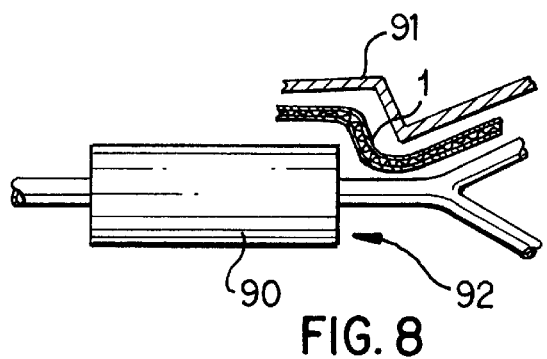
FIG. 8 is a diagrammatic illustration of the placement of the present insulator, in the form of a heat shield, underneath an automobile body and adjacent to an exhaust component.

As noted above, for particular applications, for example where the insulator is configured to insulate a heat source 90 (see FIG. 8) underneath an automobile from another part 91 of the automobile, the heat shield 1 may be in the form of a complex configured heat shield, as shown in FIG. 8, e.g. where the heat source is part of an exhaust system, generally 92, of an automobile, again as shown in FIG. 8. In such a configuration, as explained above, it is important that the Z-direction compressive strength of the knitted fabric is sufficient to prevent substantial Z-direction compression of the insulator upon impact thereof by usual road hazards. This must be achieved, while at the same time limiting heat transfer through the insulator in the Z-direction (transverse direction), by either conduction or convection heat transfer, as also explained above. The ability of the present knitted fabric to achieve these results can best be understood by reference to FIG. 4.

As shown in that Figure, a loop 25 of knitted fabric separator 2 will, generally, upstand from the planar area of the knitted fabric and contact a thin metal sheet 3 at a tangent, or contact portion 27. It is only at that tangent, or contact portion 27 that heat can be transferred by conduction from sheet 3 through the tangent, or contact portion 27, wire loop 25, wire loop 28 and the tangent, or contact portion 29 to the next under thin metal sheet 4. Thus, the limiting factor in such heat conduction is the tangent, or contact portions 27 and 29. If the area of those contact portions is kept small by a small arc 26 of loop 25, the area for heat conduction will be decreased. On the other hand, if the arc 26 of loop 28 is larger, as shown by contact portion 29, the heat conduction will be larger. It is for this reason that, as noted above, the loops of the knitted metal wire fabric, at the outermost ends 22, have arcs 26 with a general radius of very small dimensions. These smaller radiuses produce smaller tangent, or contact portions 27 and 29 for contact between the thin metal sheets 3, 4. By keeping the radius of the loops small, the cumulative tangent, or contact, area of all of the loops of the knitted fabric contacting an adjacent thin metal sheet will still be quite small, e.g. well below 30%, for example 15% or less, and this is a rather surprising results, particularly as opposed to the result with a woven material, as used in the Rhudy patent, and as described above. This is because the radius of an arc of threads of a woven material, whether the warp or weft threads, is significantly greater than the radius of an arc of the present non-woven knitted fabric separators, and, consequently, the tangent, or contact, area between a woven material, such as the woven material of the Rhudy patent, still presents considerable cumulative tangent, or contact, area for conductive heat transfer. For the very same reason, while the embossments of the Sheridan, et al patents are much fewer in number than the loops of the present knitted separator, the total cumulative contact area of those embossments is still greater than the total contact area of the knitted fabric separator, and, hence, conductive heat transfer in the present arrangement is still significantly less than conductive heat transfer in the arrangement of the Sheridan, et al patents.

Accordingly, it can be seen that the use of the knitted fabric of the present invention avoids the difficulties of a woven material, according to the Rhudy patent or the embossments of the Sheridan, et al patents.

It will also be observed that the loops of the knitted fabric, as opposed to the relatively large embossments of the Sheridan, et al patents, allows less air currents between adjacent thin metal sheets, and, consequently, also considerably reduces convection heat transfer between the sheets. Thus, the knitted fabric is a very improved fabric for limiting conduction and convection heat transfer between adjacent thin metal sheets, which transfer is to be avoided to the extent possible, but, in addition thereto, the knitted fabric provides very substantial Z-direction strength, as briefly noted above.

In this latter regard, as can be seen from FIG. 2, the knitted, metal wire, fabric separator 2 is interdisposed between adjacent thin metal sheets 3, 4, 5, 6 and 7. As explained above, while the loops of the knitted fabric separator have small tangent, or contact portions (27 and 29 in FIG. 4), there are a large number of such loops contacting adjacent thin metal sheets. This could be analogized to a multitude of small points of support, spacing apart adjacent sheets, but, cumulative, provide very substantial support for maintaining that spaced-apart relationship, even when a substantial stress is applied to the insulator in the Z-direction. That stress could, among others, be a result of a road hazard for an automobile (e.g. a thrown stone, road debris and the like) or could be a misadventure of a mechanic working under the automobile and inadvertently hitting the insulator and causing a stress in the Z-direction. In addition, that stress could be caused by forming a complex contour of the insulator, in a usual bending or forming operation, to reach a shape of an automobile heat shield, somewhat along the lines illustrated in FIGS. 1A and 8. These kinds of Z-direction stresses can cause serious indentation, crumpling or bending of the insulator, and when that occurs, the thin metal sheets move very close to one another or even touch, and, of course, this results in substantially increased conduction heat transfer in the Z-direction through the insulator, which, of course, should be avoided to the extent possible.

However, with the present knitted fabric, the thin metal sheets are so supported by the knitted fabric that the sheets will not be dented or otherwise unduly stressed, as opposed to the embossment arrangement of the Sheridan, et al patents. In addition, since the knitted fabric separator has substantial Z-direction columnar (compressive) loading capabilities, this allows the insulator to be configured into complex shapes without the insulator substantially buckling or crinkling or indenting, which would, again, increase the above-noted heat transfer. Further, since a knit, inherently, has essentially full degrees of freedom in the X and Y-directions (planar directions) thereof, the knit can stretch or compact in both of these directions, since it is separate and distinct from the sheets (not attached), and this very greatly facilitates the forming of the insulator into very complex shapes without the insulator crinkling, buckling or indenting.

All of the above properties are surprising, especially when considered with the additional property that the knitted fabric separator improves the insulation properties of the insulator.

The use of the knitted fabric separator also provides very important advantages in construction of the insulator. As opposed to the Sheridan, et al patents, where embossments are required in the thin metal sheets, no such embossments are required with the present invention, and the complex and complicated machinery for forming the embossments of the Sheridan, et al patents may be totally eliminated. Likewise, the embossed sheets of the Sheridan, et al patents require special handling for assembling the embossed sheets, optionally with unembossed sheets, but with the present invention, the knitted fabric separator may be simply laid on the thin metal sheets without any particular care in such laying, and the insulator formed by closing the peripheral edges (totally or partially) by usual manufacturing methods, e.g. crimping or welding or a combination thereof. Further, no special care is required in forming the insulator into complex configurations, since, with the present knitted fabric, those complex configurations can be achieved without fear of causing undue Z-direction stress and the attendant difficulties, e.g. buckling, crinkling and the like.

The knitted, metal wire, fabric separator is commercially available, and the thin metal sheets are, of course, readily commercially available. Accordingly, the process for producing the present insulators is quite simple. All that is required is that of laying a thin metal sheet on a support, overlaying that thin metal sheet with the knitted fabric separator, and repeating that process until the desired number of thin metal sheets and knitted fabric separator layers are provided. That assembly is then cut to size and placed in a conventional crimper or the like to crimp peripheral edges (the entire peripheral edge or a part thereof), and, if desired, that edge may also be welded, e.g. spot welded with a conventional spot welding machine, for added security of the insulator. If the insulator requires special contours, those contours can be achieved simply by placing the so-formed insulator into a die/press for forming the insulator in the complex configuration. Since the thin metal sheets are still pliable and the knit, as explained above, has degrees of freedom in the X and Y-directions, and substantial freedom in the Z-direction, that die/press operation need not be carried out with any heating and may a cold forming operation. If desired, the top and bottom thin metal sheets may have a pattern of light or heavy score lines 11 (see FIGS. 1A and 1B) of conventional nature to facilitate such forming.

Essentially all of the above discussion with respect to the knitted fabric separator embodiment is equally applicable to the twisted, expanded foil embodiment of the separator and will not be repeated for sake of conciseness. The twisted, expanded foil embodiment of the separator is shown in FIGS. 5A and 5B. While the expanded foil embodiment of the separator does not have as good Z-direction rigidity as the knitted fabric embodiment and, in that sense, is not a preferred embodiment for general applications of the insulator, the expanded foil embodiment does have advantages for the specialized application of an automobile heat shield, e.g. near an exhaust system thereof, and, in that sense, is the preferred embodiment of the separator for such application.

In this latter regard, first of all, the expanded foil is less expensive and lighter in weight than the knitted fabric, and both of these are important for automobile application of the insulator. In addition, for use as an exhaust heat shield, the peripheral edges (see FIGS. 1A and 2) must be sufficiently sealed near compressed portions 20 to substantially prevent egress of moisture, as noted above. When the knitted fabric is used as the separator, and it is substantially co-extensive with the thin metal sheets, it is difficult to produce a fully reliable seal at those peripheral edges by a conventional pressing operation, i.e. a conventional crimping operation, because of difficulty in fully compressing the knitted fabric to effect such a seal. Hence, some welding, e.g. spot welding, or other sealing means, e.g. clamps, may be required, and this increases the cost, and possibly the weight, of a so-produced insulator, both of which are undesired for automobile use.

However, the expanded foil embodiment is easy to compress at its edges with conventional pressing operations since it is collapsible in the Z-direction to essentially a planar configuration, as opposed to a knitted fabric. Hence, the foil may be sealed in such a conventional pressing operation, e.g. a conventional "toy" crimping operation, and, in this sense, is superior in function to the knitted fabric for an automobile exhaust system heat shield, and, thus, a preferred embodiment therefor.

Turning now to FIGS. 5A and 5B, the twisted expanded foil separator, generally, 45 is a relatively new manufacture and is made by simultaneously cutting a thin metal sheet and stretching the metal sheet while bending at about a 180° angle, such that all of the X, Y and Z-dimensions are greater than the original, e.g. 2 to 50 times in the X and Y-directions to 200 times or more in the Z-direction. The portions of the sheet between cuts, when the sheet is stretched and bent at about 180°, becomes twisted portions, i.e. during stretching and bending, the cut portions twist from the plane of the metal sheet and produce spaced apart, substantially vertically disposed portions, connected together by twisted cut portions. The vertically disposed portions extend further from a central plane of the expanded foil than do the twisted portions. This is idealized in FIG. 5A where there are a plurality of generally vertically disposed portions 46 connected by twisted portions 47. All parts of the twisted portions 47 lie closer to a central plane 48 of the expanded foil than do all parts of the vertically disposed portions 46, and, therefore, the generally vertical portions 46 have an upper surface 49 and a lower surface 50 which extend, respectively, further from central plane 48 than do the twisted portions 47. Thus, inherently, a twisted, expanded, metal foil provides contact portions, as indicated by arrows 52 (the upper and lower parts of vertical portions 50) having contact surfaces the same as described above in connection with the generalized embodiments of FIGS. 10, 11 and 12. As can be easily seen, the open structure and, hence, cumulative contact surface area of the contact portions 52 is small compared with the planar area 48, as required above in connection with the generalized embodiments of FIGS. 10, 11 and 12 and, indeed, considerably less than 30% of that planar area, i.e. less than 1%. In the embodiment of the following example, the surface area is about only 0.3%. It can also be seen that the contact portions 52 are spaced apart and, thus, provide the same spaced-apart contact surfaces, as also required by the generalized embodiments. Likewise, the contact portions on the upper and lower surfaces are spaced apart by a substantial Z-direction dimension and are connected by Z-direction connectors, i.e. the main body of the vertical portions 50, and are capable of substantial compressive loading. Also, each contact portion (vertical portion 50) is connected to another contact portion by X and/or Y-connectors, i.e. twisted portions 47 which do not substantially contact a thin metal sheet when used as a separator.

Thus, the twisted, expanded foil meets all the requirements as explained above in connection with the generalized embodiments, but is also light in weight, inexpensive, and sealable at the peripheral edges, which makes it ideal for use in providing the automobile exhaust heat shield.

From the above, it can be seen that the present open separators, with substantial Z-direction dimension can function well in the present insulators. In this regard, preferably, the separators should have a Z-direction dimension with a ratio of at least 0.10, preferably 0.15 and more preferably 0.20, and up to about 0.5 or more of a unit planar area. For example, with a unit planar area of one square centimeter, the Z-direction dimension should be at least 0.1 centimeter, i.e. a ratio of 0.1. This, coupled with the contact surface area being less than 30% of a planar area of the separator (which indicates the open configuration), as explained above, and especially the latter, provides the improved heat transfer properties of the present insulator, as shown by the example which follows. In the expanded foil embodiment, the Z-direction increase, compared with the non-expanded metal foil, is very great, e.g. the Z-direction expansion can easily be about 190 times or more, e.g. from a non-expanded metal sheet of 0.002 inch to an expanded sheet of 0.375.

The invention will now be illustrated by the following example, but it is to be understood that the invention is not limited to the illustrative example but extends to the scope of the foregoing disclosure. In the example, as well as the specification and claims, all percentages and parts are by weight, unless otherwise indicated.

EXAMPLE

An automobile exhaust system heat shield was produced by laying a bottom thin metal sheet of aluminum foil of 0.002 inch thickness. The aluminum was a bright finish grade of 1145 aluminum alloy with a ¼ hard temper and a lightly scored 0.75 inch by 0.25 inch diamond pattern was on the surface thereof. Twisted expanded aluminum foil (0.002 inch original thickness and about ⅜ final thickness, with a Z-direction ratio of about 0.15 and a density of 3 grams per cubic foot) was laid on the bottom sheet. Additional layers of sheet and expanded foil were also laid and lastly a top thin metal sheet was placed thereon, the top metal sheet being the same as the bottom sheet, except that it had a thickness of 0.004 inch.

The so assembled layers were simultaneously cut with steel rule trim dies to approximately desired sizes. The outer one inch edge of the die cut assembly was flattened for crimping and folding purposes and the assembly was crimped in a "Toy Curl" crimper such that ¼ to ½ inch of the peripheral edge was folded under toward the bottom sheet by using 3 HIT punch dies (Generalizer Tool & Die Co., Greensboro, Ohio) to seal the peripheral edges.

In tests, heat shields were made having various numbers of such layers. The test shields were serially placed in a heatbox with a 200,000 BTU/hr. torch generator heating a 2.25 inch pipe (to simulate an automobile exhaust pipe) and a simulated automobile floorpan (20 gauge sheet steel) was placed about one inch from the pipe. A fan simulated air flow over the test assembly (simulates a moving automobile). Each test sample was placed between the pipe and floorpan, and the pipe was heated for 30 minutes at 1,000° F.±20° F. and with a wind speed (by the fan) of 200 feet/min. Then the pipe temperature was increased to 1,050° F.±20° F. for 15 minutes and with a wind speed of 120 feet/min. Finally, the heat and fan were turned off, and the test assembly "soaked" in the heatbox for 45 minutes.

The same above test was also performed with a heat shield manufactured by the assignee of, and according to, the Sheridan, et al patents, which, instead of the present expanded foil, uses embossments to separate the thin metal sheets In all tests, the temperature of the floorpan or the outer surface (skin) of the heat shield was determined.

Figure 14:
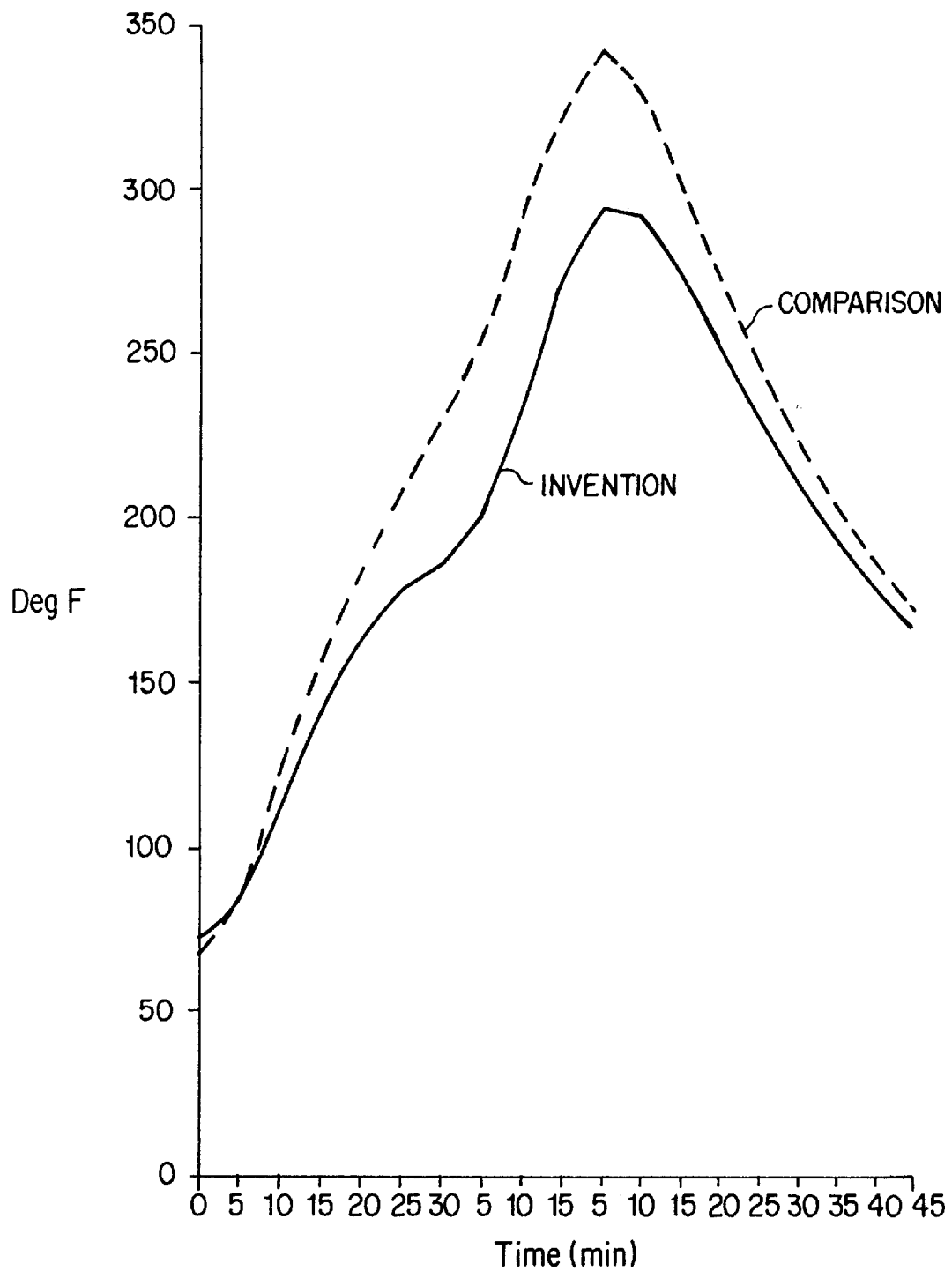
FIGS. 14, 15, 16 and 17 graphically present the data reported in the working example.

FIG. 14 shows the results of the present assembly having 10 layers of thin metal sheets and 9 layers of expanded foil labelled "Invention" and compared with a 10-layered embodiment of the Sheridan, et al patents, labelled "Comparison". As can be seen from FIG. 14, the maximum floorpan temperature of the Invention assembly was about 290° F., while the maximum floorpan temperature of the Comparison assembly was about 340° F., i.e. the Invention assembly decreases heat transfer by about 32%.

Figure 15:
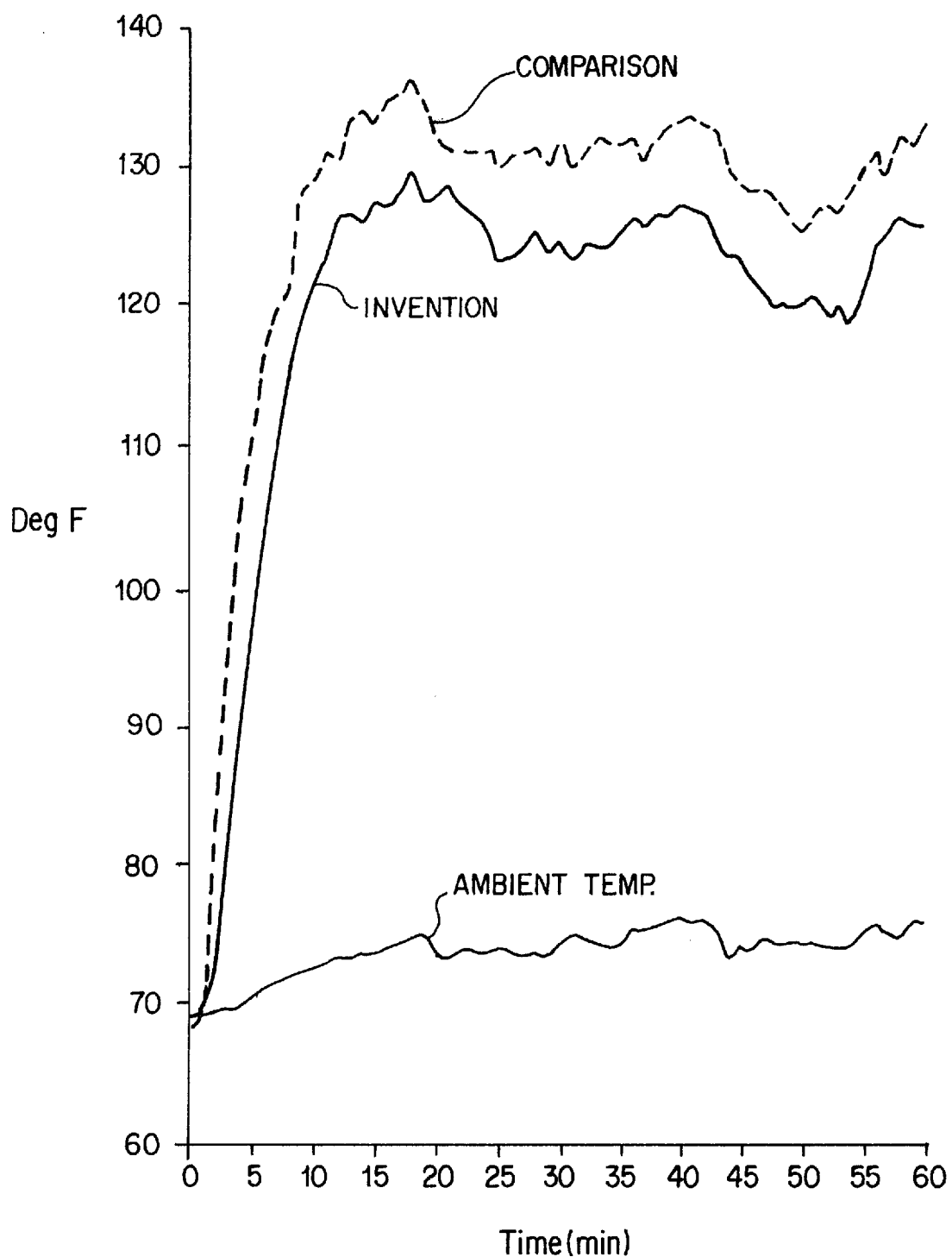

FIG. 15 shows the outer sheet temperature of a similar test, except that the "soak" period was eliminated and the heat was continuous at 1,050° F.±20° F. for an assembly of 6 layers of both the Invention assembly and the Comparison assembly for samples of 12 inches by 12 inches. It can be seen that the Invention assembly reduced the outer sheet temperatures by an average of about 14%.

Figure 16:
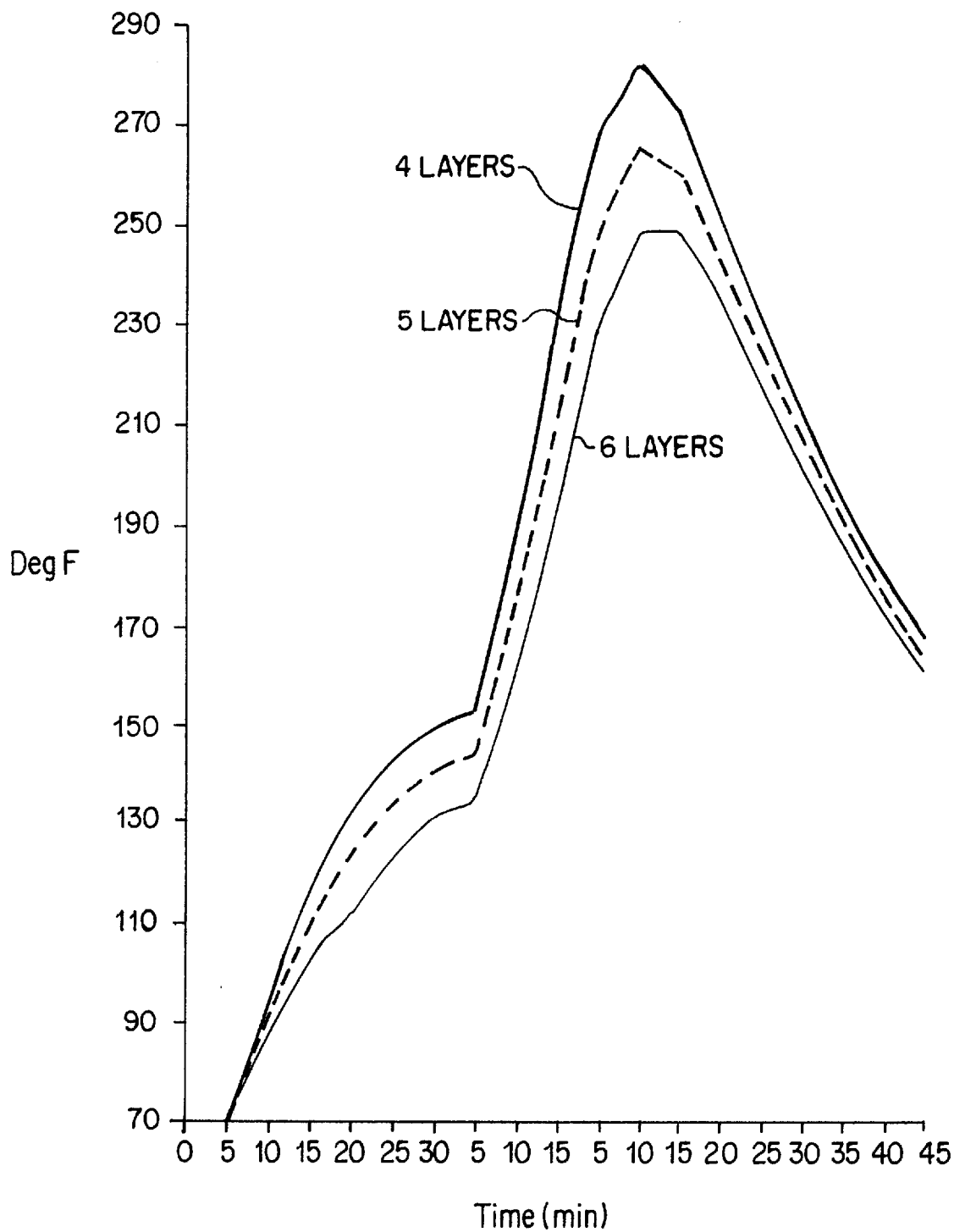

FIG. 16 shows floorpan temperatures of a similar test, but with 6 layers, 5 layers and 4 layers of the Invention assembly. It will be seen that the temperature profiles are similar, but the floorpan temperature drops about 18° F. on average for each additional layer.

In addition, Z-direction compressive strengths were performed on the Invention and Comparison samples of FIG. 15. In the test, a penetrometer with a one inch diameter foot is loaded with increasing amounts of weight, and the sample is allowed to compress in the Z-direction. The resulting thickness of the sample at each weight increment is recorded.

Figure 17:
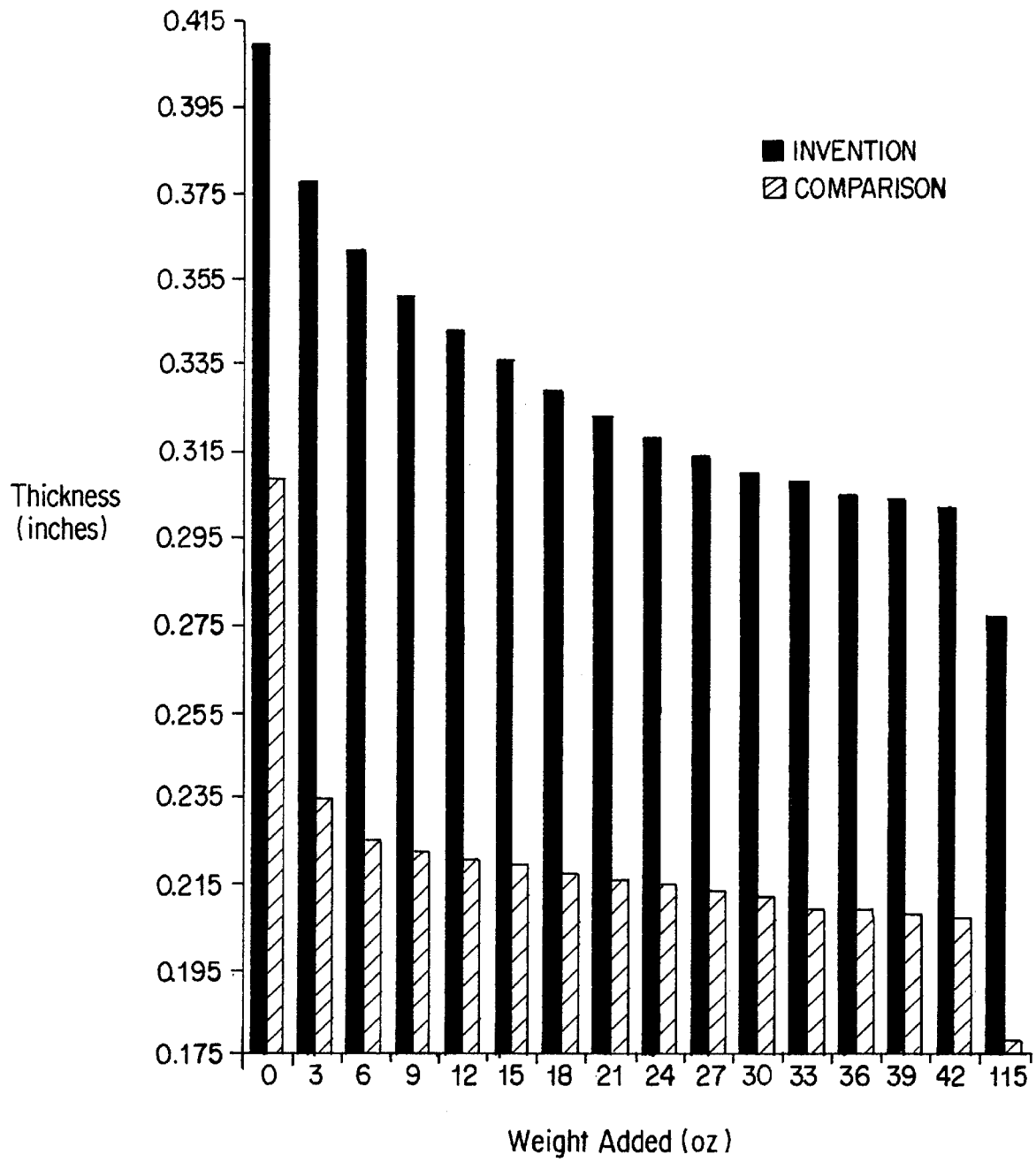

As can be seen from FIG. 17, the initial thickness of the Invention sample (6 layers) was about 0.410 inch, while the thickness of the Comparison sample (6 layers) was about 0.310 inch, which is a result of the present greater Z-direction dimension of the present expanded foil separators. With the application of 3 ounces of weight, the Invention sample compressed to about 0.378 (about 7.8%), while, with that same weight, the Comparison sample compressed to about 0.235 (about 24%). Both samples, thereafter, gradually compressed through a loading of a total of 42 ounces. This portion of the test simulates road hazards, e.g. stones thrown into the heat shield of an automobile at different speeds or weights. It can be seen, therefore, that the Invention sample is quite superior to the Comparison sample in this regard.

Also note that the last compression test loaded to 115 ounces (about 7.2 pounds) which simulates a possible misadventure of a mechanic working underneath an automobile and near the heat shield. Note that the Invention sample compressed from about 0.301 inch to about 0.278 inch (about 7.6%), while the Comparison sample compressed from about 0.208 inch to about 0.178 inch (14.4%).

Thus, it can be seen that the invention provides a 32% decrease in heat transfer, a decrease in outer sheet temperature of about 14%, and a quite significant increase in Z-direction compressive strength. Results of this nature provide a substantially improved metal heat insulator.

The invention is set forth in the attached claims, but it will be easily understood that the invention admits to many obvious variations, and the claims are intended to include such variations within the spirit and scope thereof.

What is claimed is:

1. A process for producing a generally elongated metal heat insulator, comprising:

(A) assembling alternating layers of a thin metal sheet and a metal separator such that the layers are disposed generally one above the other, said metal separator being a non-woven, substantially open, metal mesh which is not permanently attached to or part of the thin metal sheet, has a substantial Z-direction dimension and has substantially parallel upper and lower contact surfaces spaced apart in a Z-direction; and wherein said mesh is in the form of a twisted expanded metal mesh having spaced apart substantially vertically disposed portions and cut twisted portions connecting the vertically disposed portions and the vertically disposed portions extending further from a central plane of the mesh than the twisted portions such that the twisted portions do not substantially contact an adjacent thin metal sheet and the upper contact surface and a lower contact surface formed by the vertically disposed portions have contact surface areas of less than 5% of a planar area of the mesh parallel to X and Y-dimensions of the mesh; and (B) at least partially closing peripheral edges of the assembled layers.

2. The process of claim 1, wherein the assembly has an upper layer of the thin metal sheet.

3. The process of claim 2, wherein the assembly has a lower layer of the thin metal sheet.

4. The process of claim 1, wherein the peripheral edges are totally closed.

5. The process of claim 1, wherein the assembled layers are cut into configurations.

6. The process of claim 5, wherein both the peripheral edges are closed and the assembled layers are cut in a single step.

7. The process of claim 5, wherein the cutting is by a rule die.

8. The process of claim 1, wherein the closing is by one or more of crimping and welding.

9. The process of claim 1, wherein there are from two to twenty-five layers of thin metal sheets.

10. The process of claim 1, wherein the peripheral edges are closed by clamping the edges.

11. The process of claim 10, wherein the peripheral edges are clamped by forming a toy curl about the peripheral edges.

12. The process of claim 1, wherein the sheet has a thickness of about 0.0005 inch to about 0.030 inch.

13. The process of claim 1, wherein the sheet has a surface area-to-thickness ratio of at least 1000:1.

14. The process of claim 1, wherein the contact surface area is less than 1% of the planar area.

15. The process of claim 1, wherein the metal of the sheet is selected from the group consisting of steel, aluminum, copper, and tin.

16. The process of claim 1, wherein the sheet has a metal coating thereon.

17. The process of claim 16, wherein the metal coating is an anti-corrosion coating.

18. The process of claim 1, wherein there are more than two sheets and each sheet is spaced from an adjacent sheet by at least about 0.020 inch.

19. The process of claim 1, wherein the ratio of the Z-dimension to the planar area is at least 0.10.

20. The process of claim 1, wherein the sheet has a bright surface with a low thermal emissivity.

21. The process of claim 20, wherein the emissivity is less than 0.1.

22. The process of claim 1, wherein the mesh is made of a metal selected from the group consisting of steel, aluminum, copper, and tin.

23. The process of claim 22, wherein the metal has a coating thereon.

24. The process of claim 1, wherein the mesh is in a crimped configuration.

25. The process of claim 1, wherein the mesh is substantially co-extensive with at least one sheet.

26. The process of claim 1, wherein there are more than two sheets.

27. The process of claim 26, wherein peripheral edges of the sheets are in contact with each other and with said mesh.

28. The process of claim 26, wherein there are two or more layers of the mesh between adjacent sheets.

* * * * *